March 27, 1934. E. F. WEBB ET AL 1,952,695
COMPOSITE GROMMET
Filed Jan. 29, 1930
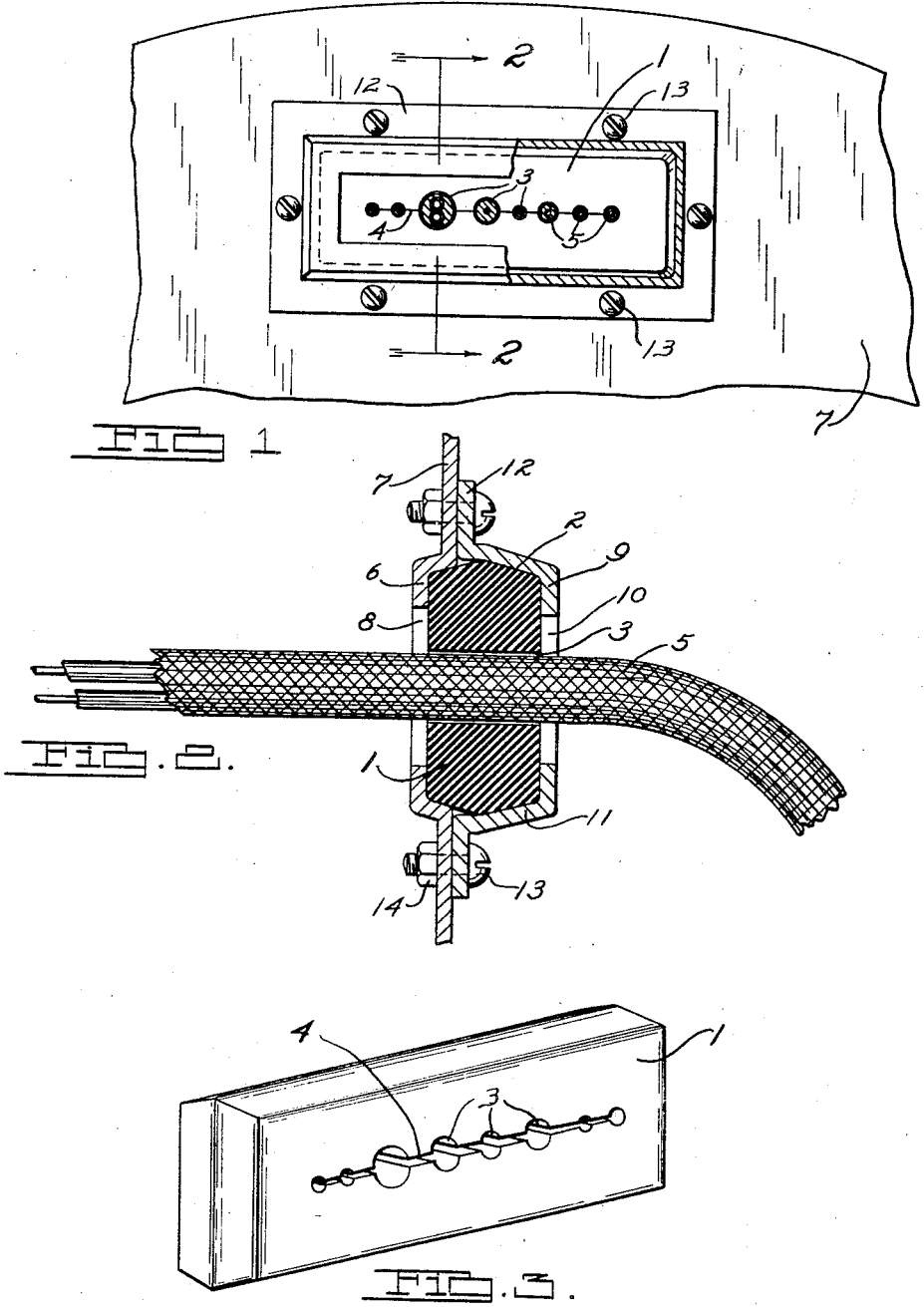
INVENTOR
EDMOND F. WEBB. AND
RUFUS C. SANDERS.
BY
ATTORNEY

UNITED STATES PATENT OFFICE 1,952,695

COMPOSITE GROMMET

Edmond F. Webb, Highland Park, and Rufus C. Sanders, Detroit, Mich., assignors to Chrysler Corporation, Detroit, Mich., a corporation of Delaware Application January 29, 1930, Serial No. 424,379

3 Claims. (Cl. 173—311)

The main objects of this invention are to provide an improved grommet for retaining a plurality of conductors and similar members, such as tubes and flexible cables, in spaced relation to each other and in insulated relation to the structure through which they pass; to provide a device of this kind which may be conveniently spread apart for permitting insertion of articles through spaced apertures; and to provide an improved means for detachably securing a grommet to the dash of a vehicle so as to yieldably support articles which extend therethrough.

An illustrative embodiment of our invention is shown in the accompanying drawing, in which:

Fig. 1 is a fragmentary elevation of a partition embodying our invention.

Fig. 2 is a vertical section taken on line 2—2 of Fig. 1.

Fig. 3 is a perspective detail of a grommet.

In the form shown, the grommet consists of a yieldable block 1, having beveled edges 2 and preferably comprises rubber material in which are formed a plurality of spaced apertures 3. The apertures are arranged in alignment with each other and extend longitudinally of the block 1. The material of the block which is between adjacent apertures, is severed, as shown at 4, so as to permit the block to be spread apart as illustrated in Fig. 3 for admitting the articles 5, such as conduits, tubes and conductors.

The grommet 1 extends into an offset 6 in a partition 7 or dash of a vehicle. Formed in the offset part 6 is a passage 8 with which the apertures 3 register at one end. A clamping member 9 having a passage 10 in registration with the apertures 3 of the grommet, is provided for enclosing the latter and securing it to the partition 7. This clamping member comprises a casing having inclined edge portions 11 and a peripheral flange 12 through which bolts 13 extend. The bolts 13 also extend through apertufes in the partition 7 and are provided with nuts 14 by which the casing is rigidly secured in place.

The inclined edges 2 and 11 of the grommet and clamping member respectively, coact to urge the severed parts of the grommet together and firmly clamp the articles 5 which are in this manner yieldably supported in spaced relation and insulated from the metal structure of the dash and casing.

Although but one specific embodiment of this invention has herein been shown and described, it will be understood that various changes including the size, shape and arrangement of parts, may be made without departing from the spirit of our invention and it is not our intention to limit its scope other than by the terms of the appended claims.

We claim:

1. In a partition having a slot therein, a grommet comprising a yieldable rubber block having spaced apertures for receiving articles which extend through said partition, said block being severed between said apertures from a side of one aperture to a side of an adjacent aperture for permitting convenient insertion of said articles, and a clamping member mounted on said partition having an offset for receiving said block and having edges contacting with the perimeter of the latter, said clamping member being adapted to urge the severed parts of said block together.

2. In a partition having a slot therein, a grommet comprising a yieldable rubber block having spaced apertures for receiving articles which extend through said partition, said block being severed between said apertures from a side of one aperture to a side of an adjacent aperture for permitting convenient insertion of said articles, and a clamping member mounted on said partition for receiving said block, the edges of said block and clamping member being beveled for urging the severed parts of said block together.

3. In a structure having a slot therein and rigid material surrounding the latter, a grommet in said slot comprising a yieldable rubber block having a pair of spaced apertures therein, said block being severed between apertures from a side of one aperture to a side of the adjacent aperture, a casing having an opening registering with said apertures and having rigid edge and side marginal portions contacting with said rubber block, and means for fixing said casing to said structure and adapted to place said rubber block under compression so as to retain the severed parts of said block together.

EDMOND F. WEBB.
RUFUS C. SANDERS.